United States Patent
Raj et al.

(10) Patent No.: US 10,945,014 B2
(45) Date of Patent: Mar. 9, 2021

(54) METHOD AND SYSTEM FOR CONTEXTUALLY AWARE MEDIA AUGMENTATION

(71) Applicants: Tarun Sunder Raj, Los Angeles, CA (US); Benjamin Tucker, White Swan, WA (US)

(72) Inventors: Tarun Sunder Raj, Los Angeles, CA (US); Benjamin Tucker, White Swan, WA (US)

( * ) Notice: Subject to any disclaimer, the term of this patent is extended or adjusted under 35 U.S.C. 154(b) by 0 days.

(21) Appl. No.: 15/654,581

(22) Filed: Jul. 19, 2017

(65) Prior Publication Data
US 2018/0027272 A1    Jan. 25, 2018

Related U.S. Application Data

(60) Provisional application No. 62/364,146, filed on Jul. 19, 2016.

(51) Int. Cl.
*H04N 21/235*    (2011.01)
*H04N 21/258*    (2011.01)
*H04N 21/234*    (2011.01)

(52) U.S. Cl.
CPC . *H04N 21/25891* (2013.01); *H04N 21/23424* (2013.01)

(58) Field of Classification Search
CPC .......................... H04N 21/234; H04N 21/2552
See application file for complete search history.

(56) References Cited

U.S. PATENT DOCUMENTS

| | | | | |
|---|---|---|---|---|
| 2004/0267816 | A1* | 12/2004 | Russek | G06F 17/30265 |
| 2006/0120670 | A1* | 6/2006 | Lee | H04N 5/783 |
| | | | | 385/55 |
| 2007/0118425 | A1* | 5/2007 | Yruski | H04L 67/306 |
| | | | | 705/14.61 |
| 2007/0288978 | A1* | 12/2007 | Pizzurro | H04N 7/17336 |
| | | | | 725/112 |
| 2008/0307454 | A1* | 12/2008 | Ahanger | G06Q 30/02 |
| | | | | 725/36 |
| 2012/0266191 | A1* | 10/2012 | Abrahamsson | G06Q 30/0224 |
| | | | | 725/35 |
| 2012/0324492 | A1* | 12/2012 | Treadwell, III | H04H 60/45 |
| | | | | 725/10 |

(Continued)

*Primary Examiner* — Mushfikh I Alam

(57) ABSTRACT

Disclosed is a method of providing augmented media content. The method may include receiving, using a communication unit, a media content and at least one broadcaster preference from a broadcaster device. Further, the method may include retrieving, using the communication unit, a plurality of augmentation content based on the at least one broadcaster preference. Further, the method may include transmitting, using the communication unit, the plurality of augmentation content to the broadcaster device. Further, the method may include receiving, using the communication unit, a selection of at least one augmentation content from the broadcaster device. Further, the method may include embedding, using a processing unit, the at least one augmentation content and the at least one broadcaster preference in the media content to obtain an augmented media content. Further, the method may include transmitting, using the communication unit, the augmented media content to the broadcaster device.

2 Claims, 9 Drawing Sheets

(56) References Cited

U.S. PATENT DOCUMENTS

| | | | | |
|---|---|---|---|---|
| 2013/0160046 | A1* | 6/2013 | Panje | H04N 21/4126 |
| | | | | 725/32 |
| 2013/0273941 | A1* | 10/2013 | Grokop | H04W 4/021 |
| | | | | 455/456.3 |
| 2014/0331264 | A1* | 11/2014 | Schneiderman | H04N 21/278 |
| | | | | 725/92 |
| 2014/0365349 | A1* | 12/2014 | Kennon | G06Q 30/0269 |
| | | | | 705/34 |
| 2015/0081890 | A1* | 3/2015 | Richards | H04L 43/16 |
| | | | | 709/224 |
| 2015/0120648 | A1* | 4/2015 | Slovacek | G06F 16/41 |
| | | | | 707/609 |
| 2015/0312633 | A1* | 10/2015 | Masciarotte | G06Q 30/0255 |
| | | | | 725/32 |
| 2015/0365627 | A1* | 12/2015 | Deng | H04N 5/23219 |
| | | | | 348/14.07 |
| 2016/0027471 | A1* | 1/2016 | Gottlieb | G11B 27/031 |
| | | | | 386/241 |
| 2016/0191958 | A1* | 6/2016 | Nauseef | H04N 21/23418 |
| | | | | 725/116 |
| 2016/0381110 | A1* | 12/2016 | Barnett | H04L 65/601 |
| | | | | 709/231 |
| 2018/0232791 | A1* | 8/2018 | Shah | G06N 3/006 |
| 2018/0336645 | A1* | 11/2018 | Price | G06Q 50/01 |

* cited by examiner

METHOD AND SYSTEM FOR CONTEXTUALLY AWARE MEDIA AUGMENTATION

The current application claims a priority to the U.S. Provisional Patent application Ser. No. 62/364,146 filed on Jul. 19, 2016.

FIELD OF THE INVENTION

The present invention generally relates to digital data processing. More specifically, the present invention relates to a method and system for augmenting media based on context.

BACKGROUND OF THE INVENTION

Until now, anyone looking to create, share or broadcast a video in a 2D, 3D or Augmented/Virtual Reality environment must manually insert interactive points, annotations, clips or any content of added value. As a viewer, the only way to receive this information is to click on these annotations, selectable areas or simply look up items of interest on the web, through social media or through any other searchable medium.

Accordingly, there is a need for improved methods and systems for facilitating augmentation of media content capable of overcoming one or more aforementioned drawbacks.

SUMMARY

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

In accordance with some embodiments, a first method of providing augmented media content is provided. The first method may include receiving, using a communication unit, a media content from a broadcaster device. Further, the first method may include receiving, using the communication unit, at least one broadcaster preference from the broadcaster device. Further, the broadcaster preference may include at least one viewer context variable. Further, the first method may include retrieving, using the communication unit, a plurality of augmentation content from at least one database based on the at least one broadcaster preference. Further, the first method may include transmitting, using the communication unit, the plurality of augmentation content to the broadcaster device. Further, the broadcaster device may be configured to present the plurality of augmentation content. Further, the first method may include receiving, using the communication unit, a selection of at least one augmentation content from the broadcaster device. Further, the first method may include embedding, using a processing unit, each of the at least one augmentation content and the at least one viewer context variable in the media content to obtain an augmented media content. Further, presenting of the augmented media content on a viewer device may be based on at least one viewer context value corresponding to the at least one viewer context variable. Further, the at least one viewer context value may be associated with the viewer device. Further, the first method may include transmitting, using the communication unit, the augmented media content to the broadcaster device.

In accordance with some embodiments, a second method of providing augmented media content may be provided. The second method may include receiving, using the processing unit, at least one broadcaster preference. Further, the second method may include receiving, using a processing unit, a media content from a media source. Further, the second method may include analyzing, using the processing unit, the media content. Further, the second method may include identifying, using the processing unit, at least one interaction element in the media content based on the analyzing. Further, the second method may include identifying, using the processing unit, at least one augmentation content based on each of the at least one interaction element and the at least one broadcaster preference. Further, the second method may include embedding, using the processing unit, the at least one augmentation content in the media content to obtain an augmented media content. Further, the second method may include transmitting, using a communication unit, the augmented media content to a viewer device. Further, the viewer device may be configured to present the media content. Further, the viewer device may be associated with at least one viewer preference and at least one viewer contextual data. Further, presenting of the at least one augmentation content may be based on the at least one viewer preference and the at least one viewer contextual data.

In accordance with some embodiments, a third method of providing augmented media content is provided. The third method may include receiving, using a communication unit, a media content from a broadcaster device. Further, the third method may include receiving, using the communication unit, at least one broadcaster contextual data from the broadcaster device. Further, the at least one broadcaster contextual data may be associated with one or more of the media content and a broadcaster associated with the user device. Further, the third method may include analyzing, using a processing unit, one or more of the media content and the at least one broadcaster contextual data. Further, the third method may include identifying, using the processing unit, a plurality of augmentation content based on the analyzing. Further, the third method may include transmitting, using the communication unit, the plurality of augmentation content to the broadcaster device. Further, the third method may include receiving, using the communication unit, a selection of at least one augmentation content from the plurality of augmentation content. Further, the third method may include embedding, using the processing, one or more of the at least one augmentation content in the media content to obtain an augmented media content. Further, the third method may include transmitting, using the communication unit, the augmented media content to the broadcaster device.

A system for providing augmented media content is also provided. The system may include a communication unit configured for receiving a media content from a broadcaster device. Further, the communication unit may be configured for receiving at least one broadcaster preference from the broadcaster device. Further, the broadcaster preference may include at least one viewer context variable. Further, the communication unit may be configured for retrieving a plurality of augmentation content from at least one database based on the at least one broadcaster preference. Further, the communication unit may be configured for transmitting the plurality of augmentation content to the broadcaster device. Further, the broadcaster device may be configured to present the plurality of augmentation content. Further, the system may include receiving a selection of at least one augmentation content from the broadcaster device. Further, the system may include transmitting the augmented media content to the broadcaster device. Further, the system may include a processing unit configured for embedding each of the at least one augmentation content and the at least one viewer context variable in the media content to obtain an augmented media content. Further, presenting of the augmented media content on a viewer device may be based on at least one viewer context value corresponding to the at least one viewer context variable. Further, the at least one viewer context value may be associated with the viewer device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
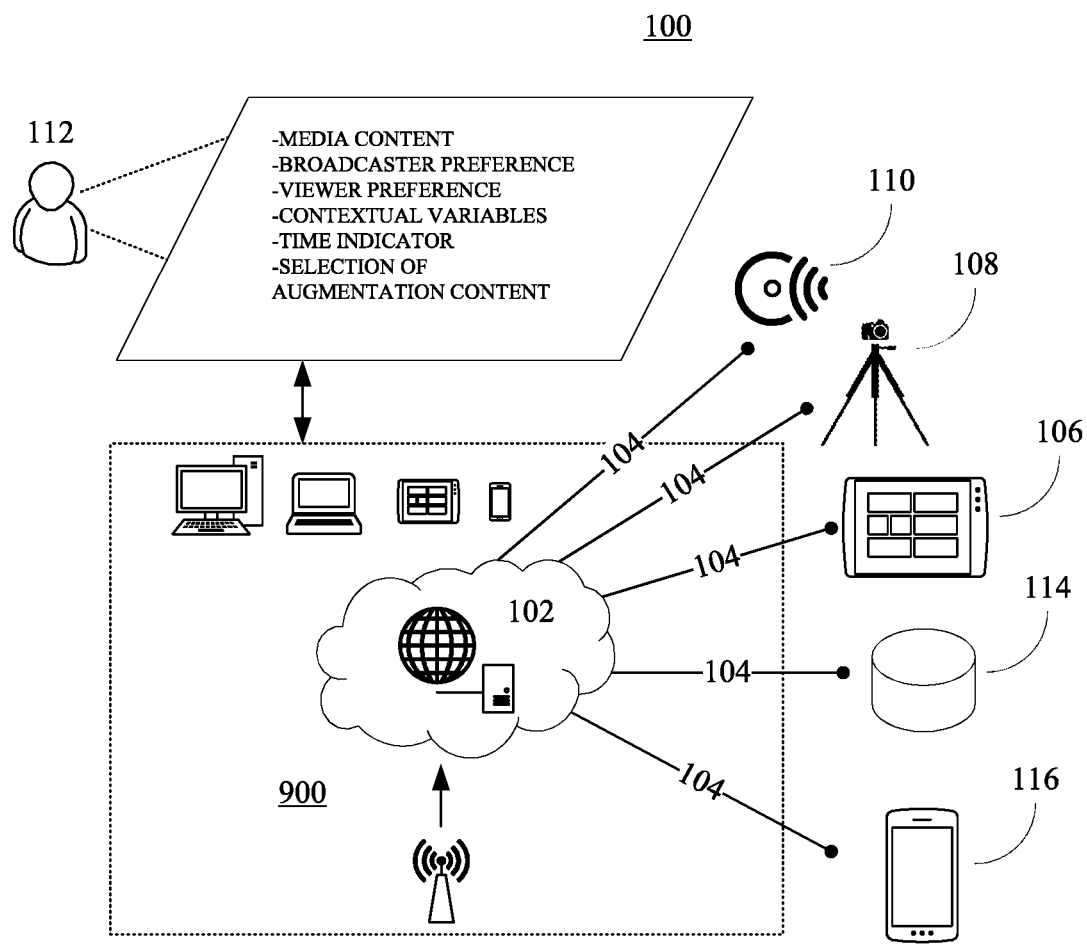
FIG. 1 is an illustration of a platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of media content, embodiments of the present disclosure are not limited to use only in this context.

Overview

Consistent with embodiments of the present disclosure, an online platform (also referred to herein as "platform" or media augmentation platform) for facilitating augmentation of media content, such as, for example, video, audio, multimedia, Virtual Reality (VR) content etc. may be provided. This overview is provided to introduce a selection of concepts in a simplified form that are further described below. This overview is not intended to identify key features or essential features of the claimed subject matter. Nor is this overview intended to be used to limit the claimed subject matter's scope. The online platform may be used by individuals or companies to facilitate augmentation of media content.

In some embodiments, the present disclosure provides a live and prerecorded contextual video engagement system, which pulls in all available data from web or open frequency sources to allow a user to annotate and augment their own content in real-time.

If surrounding information can be used for an annotation, it is placed into the user's video editing dashboard in real-time. Known as Augmented Snapshot, these items can either be inserted into the timeline or on top of live or pre-recorded content. If the augmented content the user would like to use is not available, the user can insert a query or conditional statement. Therefore, when the content is viewed it pulls the augmented content most relevant to that viewer as designated by the broadcaster. This includes, but is not limited to: connected devices, supplemental media, personal and user information, location, time, trends, tags, social media, and e-commerce listings.

Accordingly, in an instance, when a snapshot is taken, an encoding server breaks down each video into frames and utilizes local and cloud server processes along with a layer of API connections to analyze each frame for possible interactive elements. The broadcaster can use either a manual or automated process to place tracking and interaction points on people or items. The automated process connects with any data source which can provide relevant data for interaction points. This includes, but is not limited to, facial and image recognition databases, heat mapping, data from web crawlers, ad networks, content publishers, feeds, plugins, tags, promotions, user and device data, or environmental and GPS data sources. Administrators, broadcasters and viewers can add and toggle the augmented viewing modes which are most useful to them. Results from these processes are used to insert the most logical interaction points for augmented content, sign up options, relevant locations, social media, purchasing opportunities and other user data. This information is filtered for use by analyzing the metadata and preferences of the broadcaster, using that as a live query to pull in more relevant data from the contextual and user input systems. The control of this data is done with the System and User filters and the Snapshot.

Through the present invention all interactive elements are stored in a transmittable, digital interactive content container. Each container may have interaction points defined by the broadcaster or the viewer as determined by the decoding server. Viewers can utilize the available live Augmented Reality (AR) data to create their own snapshot additions to the content using interactive hotspots they create.

For live broadcast, information and category prompts for the AR broadcast display will be selected ahead of time and can be triggered by the broadcaster or set ahead of time. These elements will be received by the viewer, then searched or filtered based on their interests. Interactive containers can be sent as links, embedded on pages, assigned to specified actions, activated by context or broadcasted across a large network of publishers. Viewer modes and filters are made available based on the contextually aware data coming from the APIs and information sources.

These viewing filters/modes may be switched between, showing only the relevant interactivity. The switching process is similar to how one may switch between video and camera mode on an iPhone. To provide the fastest and most optimum experience, the default viewing mode is based on the commonalities between the broadcaster's and viewer's preferences.

All activity is cataloged and cookied for transparent user history data controls. At any point, the viewer can see what information has been stored about them and their patterns. In real-time, they can change, add to, or remove this preference data to create more accurate recommendations and profiles for their ongoing experience. The system constantly crawls available data sources, identifies interactive file types and information, then presents new interactive options to both the broadcasters and viewer.

As advertisers and content creators place their promotions on the system, viewer activity and preferences create an unprecedented transparency and accuracy allow for true utility in the promotional process. This personalization allows for the system to provide contextually aware auto-response messages, data and coupons back to the viewer. The broadcaster can customize the graphics and number of redemptions of each coupon they create on the dashboard. This system is a self-contained, hyper-intelligent content creation, management, marketing and media platform which dramatically minimizes the number of clicks required to engage each end viewer. The broadcaster also has access to the most data available; viewing patterns, hot spots, mouse movements, social trends, opt-ins and interaction history. The recommendation system works for both broadcaster and viewer, helping to determine the most effective interactions and methods to communicate the intended message. This system takes advantage of as many emerging technologies and data sources possible in order to deliver the most personalized and real-time, interactive experience available.

Platform Configuration

FIG. 1 is an illustration of an online platform 100 consistent with various embodiments of the present disclosure. By way of non-limiting example, the online platform 100 for augmenting media content based on contextual data may be hosted on a centralized server 102, such as, for example, a cloud computing service. The centralized server 102 may communicate with other network entities, such as, for example, a broadcaster device 106 (e.g. desktop/laptop computer, smartphone etc.), a media capturing device 108 (e.g. digital camera), one or more sensors 110 (e.g. environmental sensors, position/orientation sensor, location sensor, motion sensor etc.), one or more databases 114 (e.g. third party content sources, Content Management Systems etc.) and a viewer device 116 (e.g. desktop/laptop computer, smartphone, wearable computer etc.) over a communication network 104, such as, but not limited to, the Internet. Further, users of the platform may include relevant parties such as broadcasters, media editors, media consumers or viewers. Accordingly, electronic devices (e.g. laptop computer, desktop computer, tablet computer, smartphone, wearable computers etc.) operated by the one or more relevant parties may be in communication with the platform.

A user 112, such as the one or more relevant parties, may access platform 100 through a software application. The software application may be embodied as, for example, but not be limited to, a website, a web application, a desktop application, and a mobile application compatible with a computing device 900.

Accordingly, in an instance, the user 112, such as a broadcaster may access the platform in order to generate augmented media content. For instance, the broadcaster may provide a media content by either uploading the media content to the platform or providing a hyperlink to the media content. Accordingly, the platform may receive the media content. Further, the broadcaster may provide one or more broadcaster preferences which generally control augmentation of the media content. For example, the broadcaster preferences in general may determine what portion of the media content is to be augmented, which augmentation content is to be selected, how the augmentation is to be performed, to whom the augmented content is to be presented and how the augmented content is to be presented etc. Accordingly, in an instance, the broadcaster may specify one or more context variables (and associated one or more contextual values) based on which the augmentation content may be identified. The one or more contextual variables may be associated with the broadcaster and/or one or more viewers and/or one or more viewer devices. Accordingly, in an instance, the platform may communicate with one or more sensors 110 in order to determine one or more current values corresponding to the one or more contextual variables. Based on a match between the one or more current values with the one or more values specified by the broadcaster, augmentation content may be identified. Further, the online platform may perform content analysis of the media content in order to determine one or more interaction elements (e.g. people, places, brands, etc.). Accordingly, augmentation content identified by the platform may be based on the one or more interaction elements.

Further, in an instance, the augmentation content identified by the platform may be presented to the broadcaster. Accordingly, the broadcaster may provide a confirmation on the augmentation content. Alternatively, in some instances, multiple augmentation content may be presented to the broadcaster and the broadcaster may be enabled to select one or more augmentation content. Further, augmentation content confirmed and/or selected by the broadcaster may then be embedded in the media content to obtain an augmented media content. Such embedding may be performed either based on including the augmentation content per se and/or an indication (e.g. hyperlinks) associated with the augmentation content. In addition, in some instances, the augmented media content may also include the one or more broadcaster preferences. Accordingly, in an instance, when the augmented media content is being played at a viewer device, one or more current values associated with the one or more contextual variables specified in the broadcaster preferences may be determined. Further, a comparison of the one or more current values with the one or more values specified in the broadcaster preferences may be performed. Accordingly, based on a result of the comparison, further filtering of the augmentation content may be performed. As a result, a customized augmented content may be provided to viewers. In addition, in some embodiments, the augmentation content presented to viewers may be based on viewer preferences. Additionally, the online platform may be configured to receive viewer interaction data representing interaction of viewers with the augmented media content. Accordingly, the online platform may control further augmentation of media content based on the viewer interaction data. As a result, the online platform may be configured to discover patterns or trends in viewer behavior and accordingly adapt augmentation of media content.

Platform Operation

Although methods 700 and 800 have been described to be performed by platform 100, it should be understood that computing device 900 may be used to perform the various stages of methods 700 and 800. Furthermore, in some embodiments, different operations may be performed by different networked elements in operative communication with computing device 900. For example, a server may be employed in the performance of some or all of the stages in methods 700 and 800. Moreover, the server may be configured much like computing device 900.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of the methods 700 and 800 will be described in greater detail below.

Figure 7:
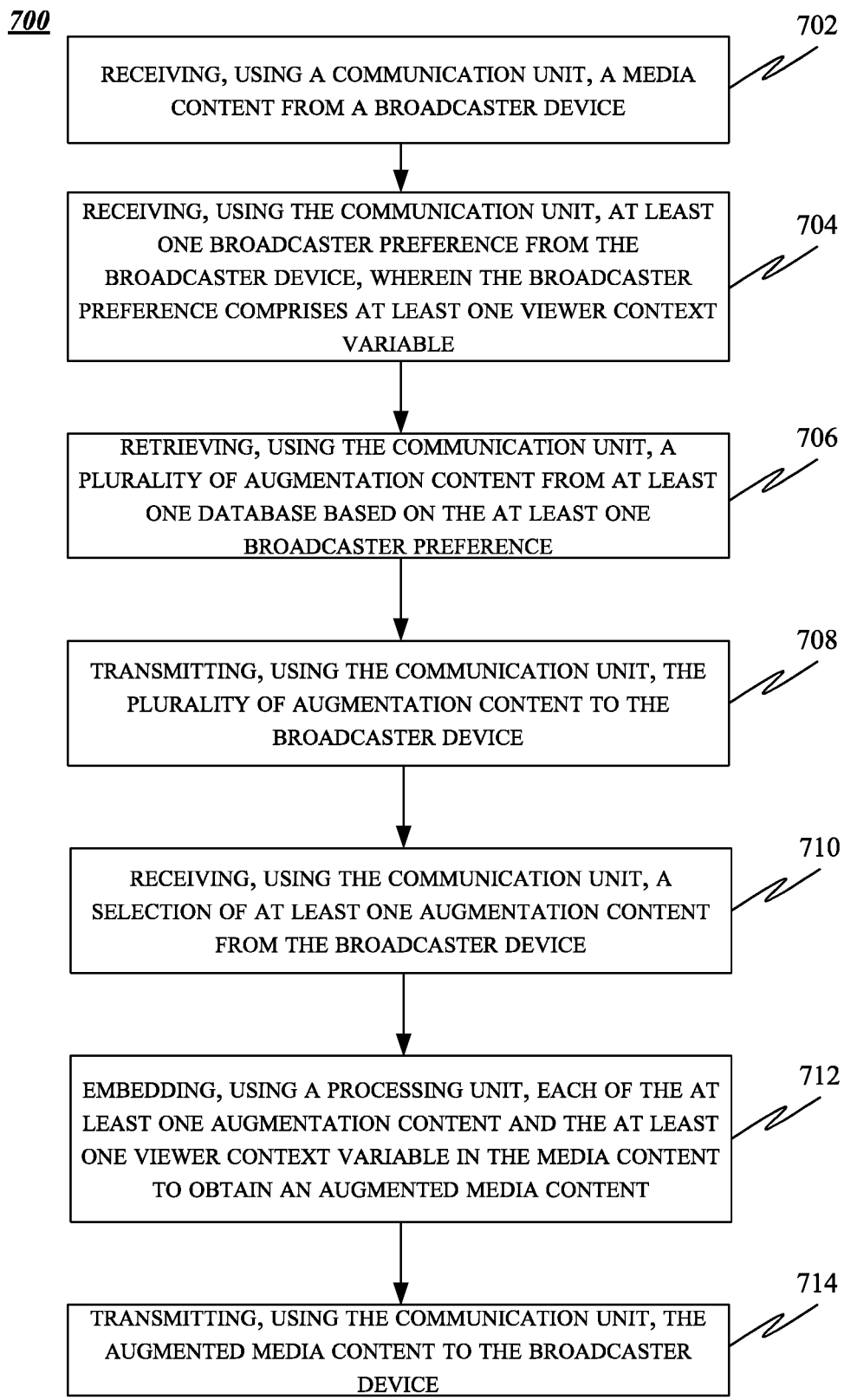
FIG. 7 illustrates a flowchart of a method of generating augmented media content, in accordance with some embodiments.

FIG. 7 illustrates a method 700 of providing augmented media content, in accordance with some embodiments. The method 700 may include receiving, using a communication unit, a media content from a broadcaster device. Further, the method 700 may include receiving, using the communication unit, at least one broadcaster preference from the broadcaster device. Further, the broadcaster preference may include at least one viewer context variable. Accordingly, the broadcaster may specify what context variables at a viewer device determine augmentation content. For example, the broadcaster may specify that augmentation content is to be presented based on time, location, sensor data, user characteristics etc. associated with the viewer device.

Further, the method 700 may include a stage 706 of retrieving, using the communication unit, a plurality of augmentation content from at least one database based on the at least one broadcaster preference. Accordingly, in an instance, the at least one database may be associated with third party systems that are in communication with the online platform.

Further, the method 700 may include a stage 708 of transmitting, using the communication unit, the plurality of augmentation content to the broadcaster device. Further, the broadcaster device may be configured to present the plurality of augmentation content. Further, the method 700 may include a stage 710 of receiving, using the communication unit, a selection of at least one augmentation content from the broadcaster device. Accordingly, the plurality of augmentation content may be viewed by a user (i.e. broadcaster) of the broadcaster device prior to making a selection of one or more augmentation content. In some embodiments, the plurality of augmentation content may include links that may enable the broadcaster device to retrieve the plurality of augmentation content from corresponding one or more databases hosting the plurality of augmentation content.

Further, the method 700 may include a stage 712 of embedding, using a processing unit, each of the at least one augmentation content and the at least one viewer context variable in the media content to obtain an augmented media content. Further, presenting of the augmented media content on a viewer device may be based on at least one viewer context value corresponding to the at least one viewer context variable. Further, the at least one viewer context value may be associated with the viewer device. Further, the method 700 may include a stage 714 of transmitting, using the communication unit, the augmented media content to the broadcaster device.

Further, in some embodiments, the augmented media content delivered to the viewer device may subsequently used by the viewer for further augmenting a part or the whole of the augmented media content as described in conjunction with FIG. 7. Accordingly, in this instance, the viewer device may function as the broadcaster device and the viewer may function as the broadcaster. As a result, users of the platform may successively share augmented media content among themselves that may be generated from one or more executions of media content augmentation as outlined in FIG. 7. In other words, the online platform may facilitate a peer-to-peer exchange of augmented media content between a first user and a second user with one or more augmentations applied prior to each exchange.

In some embodiments, the method 700 may further include receiving, using the communication unit, at least one broadcaster context value corresponding to at least one broadcaster context variable from the broadcaster device. Further, the retrieving of the plurality of augmentation content may be further based on the at least one broadcaster context value. Accordingly, contextual variables of the broadcaster device may also be used to determine relevant augmentation content to be retrieved and embedded into the media content.

In some embodiments, the at least one broadcaster context variable corresponds to at least one broadcaster sensor comprised in the broadcaster device. Further, the at least one viewer context variable corresponds to at least one viewer sensor comprised in the viewer device. Accordingly, in some embodiments, one or more sensors (for sensing motion, orientation, speed etc.) present in the broadcaster device and viewer device may determine the augmentation content to be retrieved/presented.

In some embodiments, the method 700 may further include analyzing, using the processing unit, the media content. Additionally, the method 700 may include identifying, using the processing unit, at least one interaction element in the media content based on the analyzing. Further, the retrieving of the plurality of augmentation content may be further based on the at least one interaction element.

In some embodiments, the method 700 may further include receiving, using the communication unit, viewer interaction data from the viewer device. Further, the viewer interaction data represents interaction of a viewer with the viewer device in association with the augmented content presented on the viewer device. Further, the retrieving of the plurality of augmentation content may be further based on the viewer interaction data.

In some embodiments, the augmented media content may include a plurality of augmented media contents. Accordingly, the viewer interaction data may correspond to a first augmented media content presented at a first time, whereas a second augmented media content may be retrieved based on the viewer interaction data and presented at a second time (later than the first time). Similarly, in some embodiments, the viewer device may include a plurality of viewer devices. Accordingly, interaction data received from a first viewer device may be used to retrieve an augmentation content for presentation on a second viewer device.

In some embodiments, the method 700 may further include receiving, using the communication unit, at least one viewer preference from the viewer device. Further, the retrieving of the plurality of augmentation content may be further based on the at least one viewer preference. Accordingly, viewer preferences may be taken into account by the platform while retrieving relevant augmentation content to be presented to the broadcaster.

In some embodiments, presenting of the augmented media content on the viewer device may be based further on at least one viewer preference. Accordingly, the augmented content may be further filtered at the viewer device end based on one or more viewer preferences.

In some embodiments, the method 700 may further include receiving, using the communication unit, at least one time indicator from the broadcaster device. Further, the at least one time indicator may be associated with play time of the media content. Further, the embedding of the augmentation content may be based on the at least one time indicator. Further, presenting of the augmentation content associated with a time indicator may be synchronous with presenting of the media content corresponding to the time indicator. Accordingly, the broadcaster may specify what points on the time-line of the media content (e.g. video) are to be associated with augmentation content.

In some embodiments, the at least one broadcaster preference may include a conditional statement specifying a condition based on the at least one viewer context variable and an associated augmentation content. Further, the associated augmentation content may be retrieved by the viewer device based on the conditional statement. Accordingly, in addition to augmentation content embedded by the online platform, further augmentation content may be presented to the viewer based on rules specified by the broadcaster. Accordingly, for example, during playtime of a video, augmentation content according to such rules may be retrieved and presented.

In some embodiments, the method 700 may further include receiving, using the communication unit, at least one auto-response content from the broadcaster device. Further, the at least one auto-response content may be associated with the augmentation content. Additionally, the method 700 may include embedding, using the processing unit, the at least one auto-response content in the media content. Further, the at least one auto-response content may be transmitted to at least one communication device associated with the viewer device based on an interaction of a viewer with the viewer device in association with the augmentation content. Accordingly, an SMS/email may be transmitted to the viewer based on an interaction of the viewer with an augmentation content and/or the augmented content. Further, the content of the response may be predetermined by the broadcaster and relevant custom data (e.g. name, contact number etc.) may be included based on characteristics of the viewer device.

Figure 8:
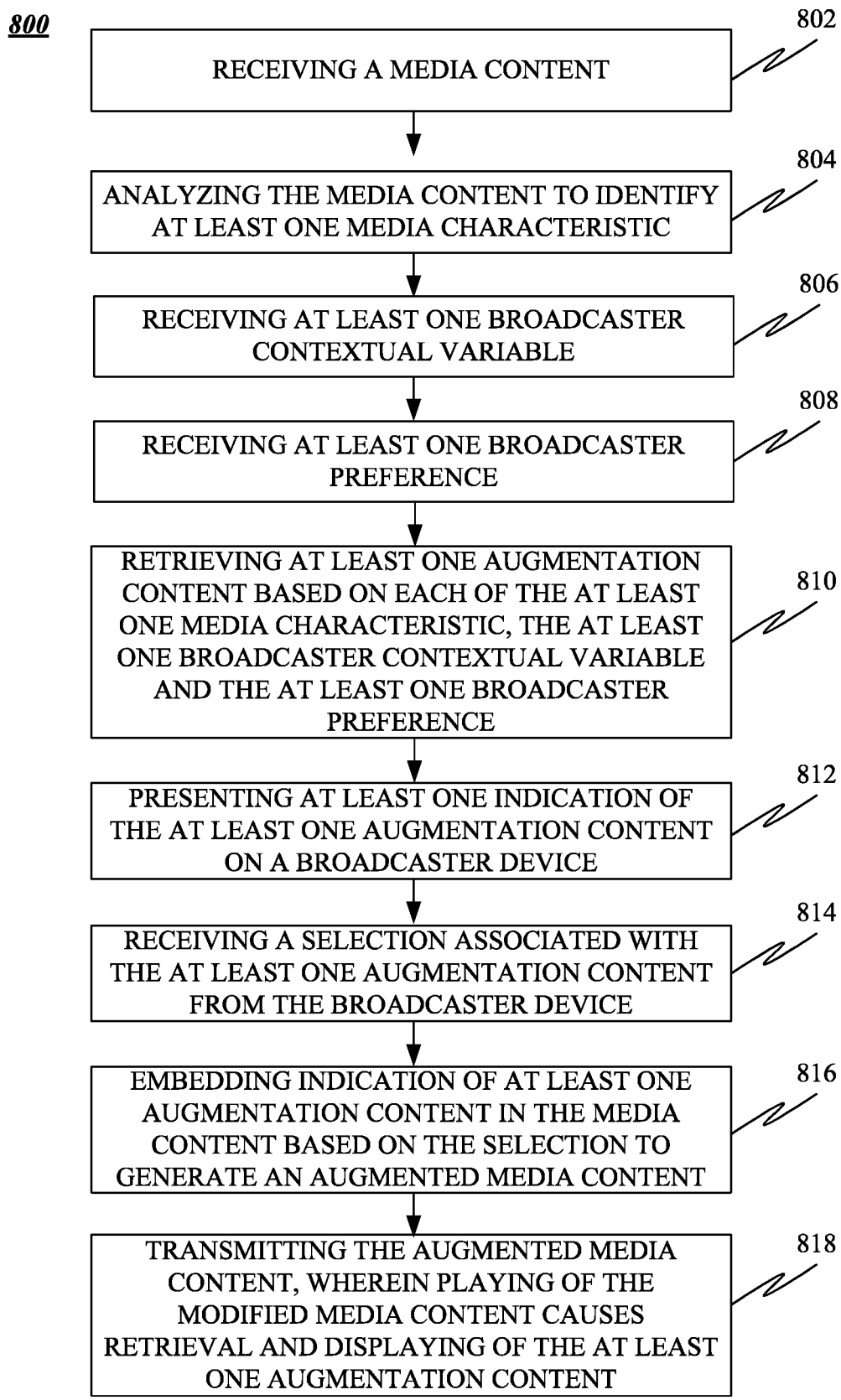
FIG. 8 illustrates a flowchart of a method of generating augmented media content based on analysis of media content, in accordance with some embodiments.

FIG. 8 illustrates a method 800 of providing augmented media content, in accordance with some embodiments. The method 800 may include a stage 802 of receiving a media content from a broadcaster device. Further, the method 800 may include a stage 804 of analyzing the media content to identify at least one media characteristic. Further, the method 800 may include a stage 806 of receiving at least one broadcaster contextual variable. Further, the method 800 may include a stage 808 of receiving at least one broadcaster preference. Further, the method 800 may include a stage 810 of retrieving at least one augmentation content based on each of the at least one media characteristic, the at least one broadcaster contextual variable and the at least one broadcaster preference. Further, the method 800 may include a stage 812 of presenting at least one indication of the at least one augmentation content on a broadcaster device. Further, the method 800 may include a stage 814 of receiving a selection associated with the at least one augmentation content from the broadcaster device. Further, the method 800 may include a stage 816 of embedding indication of at least one augmentation content in the media content based on the selection to generate an augmented media content. Further, the method 800 may include a stage 818 of transmitting the augmented media content, wherein playing of the modified media content causes retrieval and displaying of the at least one augmentation content.

In accordance with some embodiments, a second method of providing augmented media content may be provided. The second method may include receiving, using the processing unit, at least one broadcaster preference. Further, the second method may include receiving, using a processing unit, a media content from a media source. Further, the second method may include analyzing, using the processing unit, the media content. Further, the second method may include identifying, using the processing unit, at least one interaction element in the media content based on the analyzing. Further, the second method may include identifying, using the processing unit, at least one augmentation content based on each of the at least one interaction element and the at least one broadcaster preference. Further, the second method may include embedding, using the processing unit, the at least one augmentation content in the media content to obtain an augmented media content. Further, the second method may include transmitting, using a communication unit, the augmented media content to a viewer device. Further, the viewer device may be configured to present the media content. Further, the viewer device may be associated with at least one viewer preference and at least one viewer contextual data. Further, presenting of the at least one augmentation content may be based on the at least one viewer preference and the at least one viewer contextual data.

In accordance with some embodiments, a third method of providing augmented media content is provided. The third method may include receiving, using a communication unit, a media content from a broadcaster device. Further, the third method may include receiving, using the communication unit, at least one broadcaster contextual data from the broadcaster device. Further, the at least one broadcaster contextual data may be associated with one or more of the media content and a broadcaster associated with the user device. Further, the third method may include analyzing, using a processing unit, one or more of the media content and the at least one broadcaster contextual data. Further, the third method may include identifying, using the processing unit, a plurality of augmentation content based on the analyzing. Further, the third method may include transmitting, using the communication unit, the plurality of augmentation content to the broadcaster device. Further, the third method may include receiving, using the communication unit, a selection of at least one augmentation content from the plurality of augmentation content. Further, the third method may include embedding, using the processing, one or more of the at least one augmentation content in the media content to obtain an augmented media content. Further, the third method may include transmitting, using the communication unit, the augmented media content to the broadcaster device.

Figure 2:
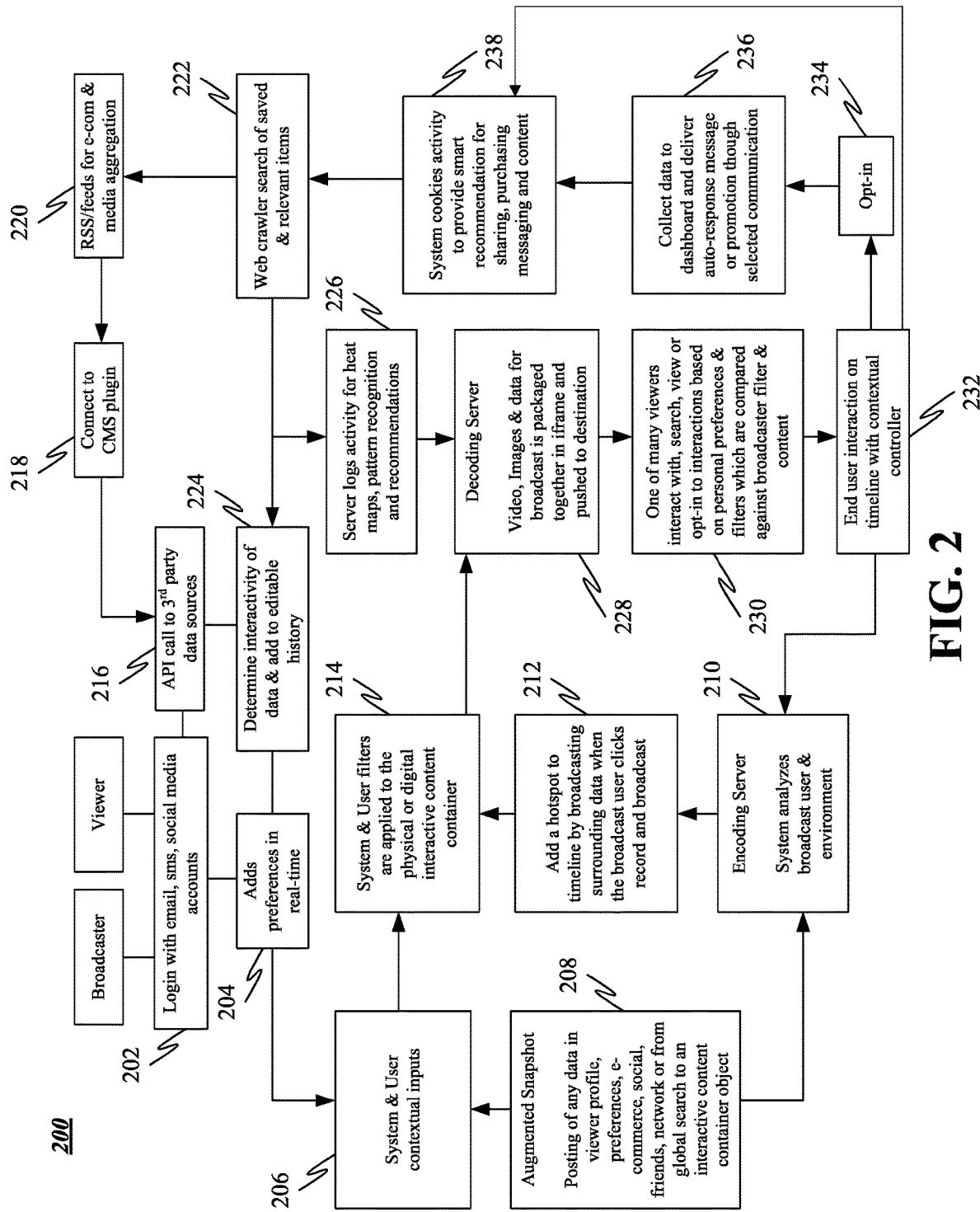
FIG. 2 illustrates a flowchart of a method of generating an augmented media content, in accordance with some embodiments.

FIG. 2 illustrates a flowchart of a method 200 of generating an augmented media content, in accordance with some embodiments. At step 202, a broadcaster and/or a viewer may login with email, SMS, social media accounts etc. At step 204, the broadcaster and/or the viewer may add preferences in real-time. At step 206, System and User contextual inputs may be received from the broadcaster and/or the viewer. In an instance, such inputs and contextual data may include environmental data, historical data, physical movements (of eyes, body etc.), facial and pattern recognition, image recognition, user preferences, IOT/WiFi/BLE/RF, social media, friends, trends data, GPS data, time, tags, advertisements, promotions, 3rd party videos etc. Further, at step 208, posting of any data in viewer profile, preferences, e-commerce, social, friends, network or from global search may be added to an interactive content container object (i.e. Augmented Snapshot). At step 210, broadcast user and environment may be analyzed. This may include for example, direction of all cameras, distance, location, elevation, position, directional movement, eye movement, mouse or gesture movement, environmental conditions, trends etc. Further, at step 212, the broadcaster may add a hotspot to timeline by broadcasting surrounding data when the broadcaster clicks record and broadcast. Further, at step 214, System and User filters may be applied to the physical or digital interactive content container. This may include, e-commerce, location/time/speed, social media, people, media content, searchable web, IOT, ad-networks etc. In order to retrieve augmentation content, a step 216 may be executed. Accordingly, API calls to 3rd party data sources may be invoked. Additionally, at step 218, connection to a CMS plugin may be established in order to obtain the augmentation content. Further, at step 220, RSS/feeds for e-commerce and media aggregation may be performed. Further, at step 222, Web crawler search of saved and relevant items may be performed. Additionally, at step 224, interactivity of data may be determined and added to editable history. Further, activity for heat maps, pattern recognition and recommendations may be logged. Further, at step 228, Video, Images and data for broadcast may be packaged together in an iframe and pushed to destination (i.e. a viewer device). Alternatively, the augmented content may be directly shared or sent to viewer via web, Bluetooth, SMS or other data transfer method. Further, in another instance, the augmented content may be broadcasted to one or more many embedded iframes on multiple destinations. Further, the viewing filters may be created based on the System and User contextual inputs available. Further, at step 230, one of many viewers may interact with, search, view or opt-in to interactions based on personal preferences and filters which are compared against broadcaster filter and content. Further, at step 232, end user interaction on timeline with contextual controller may be performed. This may include media, text, social media, email etc. Further, at step 234, viewers may opt-in for providing interaction data and/or receiving promotions, deals etc. Accordingly, at step 236, interaction data may be collected and presented on the dashboard and auto-response message or promotion may be delivered to viewers though selected communication (e.g. SMS, email, IM, social media etc.). Further, at step 238, cookies may track activity to provide smart recommendation for sharing, purchasing messaging and content.

Figure 3:
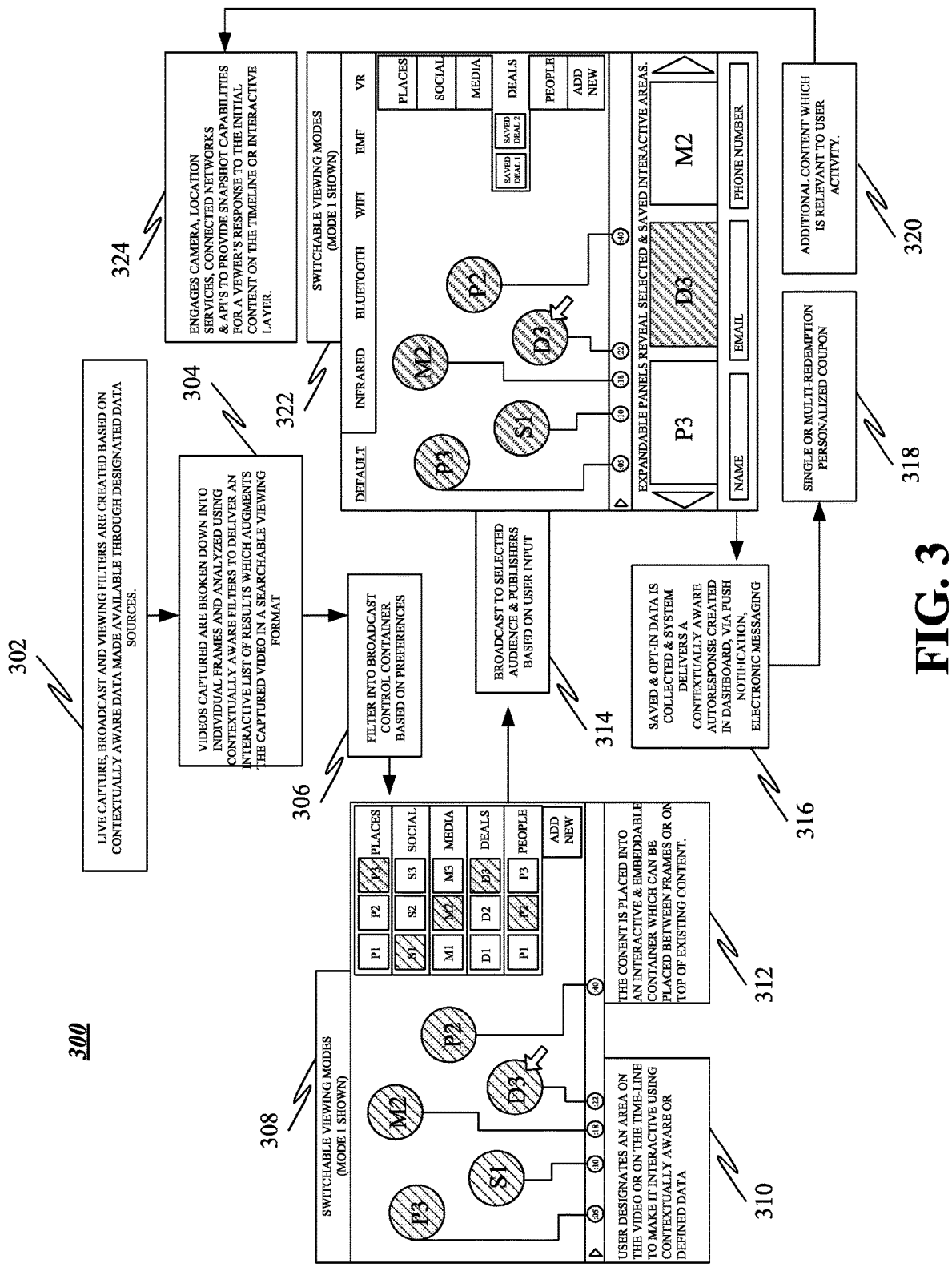
FIG. 3 illustrates a flowchart of a method of generating an augmented media content including a depiction of user interfaces presented on a broadcaster device and a viewer device, in accordance with some embodiments.

FIG. 3 illustrates a flowchart of a method 300 of generating an augmented media content including a depiction of user interfaces presented on a broadcaster device and a viewer device, in accordance with some embodiments. At step 302, live capture, broadcast and viewing filters are created based on contextually aware data made available through designated data sources. At step 304, videos captured are broken down into individual frames and analyzed using contextually aware filters to deliver an interactive list of results which augments the captured video in a searchable viewing format. At step 306, filtering into broadcast control container based on preferences may be performed. At step 308, a switchable viewing mode may be selected. Further, at step 310, the user (e.g. a broadcaster) designates an area on the video or on the time-line to make it interactive using contextually aware or defined data. For example, as illustrated, the broadcaster may identify one or more time points on the time-line of the video where augmented content is to be include. Further, for each time-point selected by the broadcaster, multiple augmented content may be presented for selection. For example, as shown, a plurality of categories of augmented content may presented, such as, but not limited to, places (P1, P2, P3), social (S1, S2, S3), media (M1, M2, M3), deals (D1, D2, D3), people (P1, P2, P3). Accordingly, the broadcaster may select one or more instances of one or more categories. For example, as shown, the broadcaster's selection of P3, S1, M2, D3, P2 corresponding to respective plurality of categories may be performed. Further, in some instances, the broadcaster may be enabled to include a new category.

Accordingly, at step 312, the content is placed into an interactive and embeddable container which can be placed between frames or on top of existing content. Further, at step 314, the content with the interactive and embeddable container may be broadcast to selected audience and publishers based on user input. At step 316, saved and opt-in data may be collected and system may deliver a contextually aware auto-response created in dashboard, via push notification, electronic messaging (e.g. SMS, email, Chat, social media, etc.). Further, at step 318 single or multi-redemption personalized coupon may be delivered. Further, at step 320, additional content which is relevant to user activity may also be delivered. Accordingly, at step 322, a viewer may select one or a plurality of switchable viewing modes and accordingly view the delivered content. Further, at step 324, engagement with camera, location, services, connected networks and API's may be performed to provide snapshot capabilities for a viewer's response to the initial content on the timeline or interactive layer.

Figure 4:
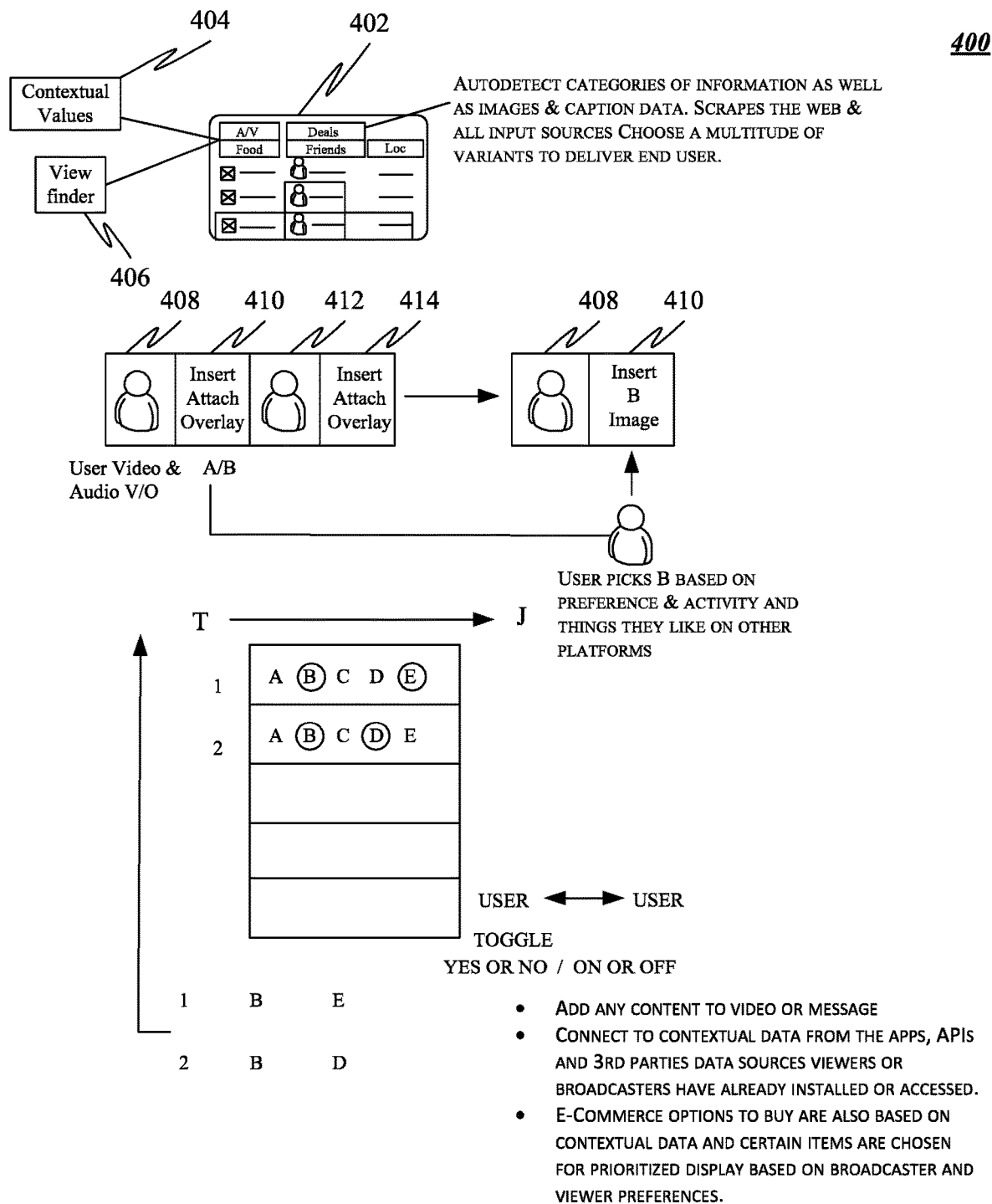
FIG. 4 illustrates embedding of augmentation content in a media content for generating an augmented media content, in accordance with some embodiments.

FIG. 4 illustrates embedding of augmentation content in a media content for generating an augmented media content, in accordance with some embodiments. As shown, the media content may be analyzed and a plurality of categories of augmentation content may be identified based on the analysis and presented to the broadcaster in user interface 402 on the broadcaster device. Further, the augmentation content may be identified based on contextual values 404 that may be determined using, for example, sensors associated with the broadcaster device and/or the viewer device. Additionally, the augmentation content may be identified based on view finder status. Accordingly, the augmentation content may be relevant only to a portion of media content associated with the view finder status. The view finder status may correspond to one or more of the broadcaster device and the viewer device. Further illustrated is the embedding of the augmentation content into the media content. In an instance, the augmentation content may be embedded in between the frames of media content. For example, augmentation content may be embedded in slots 410 and 414 interspersing media content frames 408 and 414. In an instance, the augmentation content embedded in slot 410 may include images corresponding to users A and B. Accordingly, when the user B receives the augmented media content, the image B is retrieved and presented to the user B based on preferences and/or activity of user B.

Likewise, a plurality of augmentation content corresponding to multiple users A, B, C, D and E may be embedded in the media content. Accordingly, when the augmented media content is presented on a viewer device, a respective augmentation content may be retrieved and presented to the user of the viewer device. Further, each user may specify multiple modes, wherein each mode may correspond to a filtering of the augmentation content.

Accordingly, the platform may allow adding any content to a video or message. Subsequently, the platform facilitates connecting to contextual data from apps, APIs and $3^{rd}$ party data sources already installed or accessed by viewers or broadcasters. Further, the platform also enables E-Commerce options to buy based on contextual data and certain items are chosen for prioritized display based on broadcaster and viewer preferences.

Further, in some embodiments, the viewer can respond with their own augmented content back to the broadcaster or share via 2-way multimedia messaging and interaction. Accordingly, the platform in some embodiments may function as a social media platform while enabling users to augment contextually aware content in media items, such as, but not limited to, videos.

Figure 5:
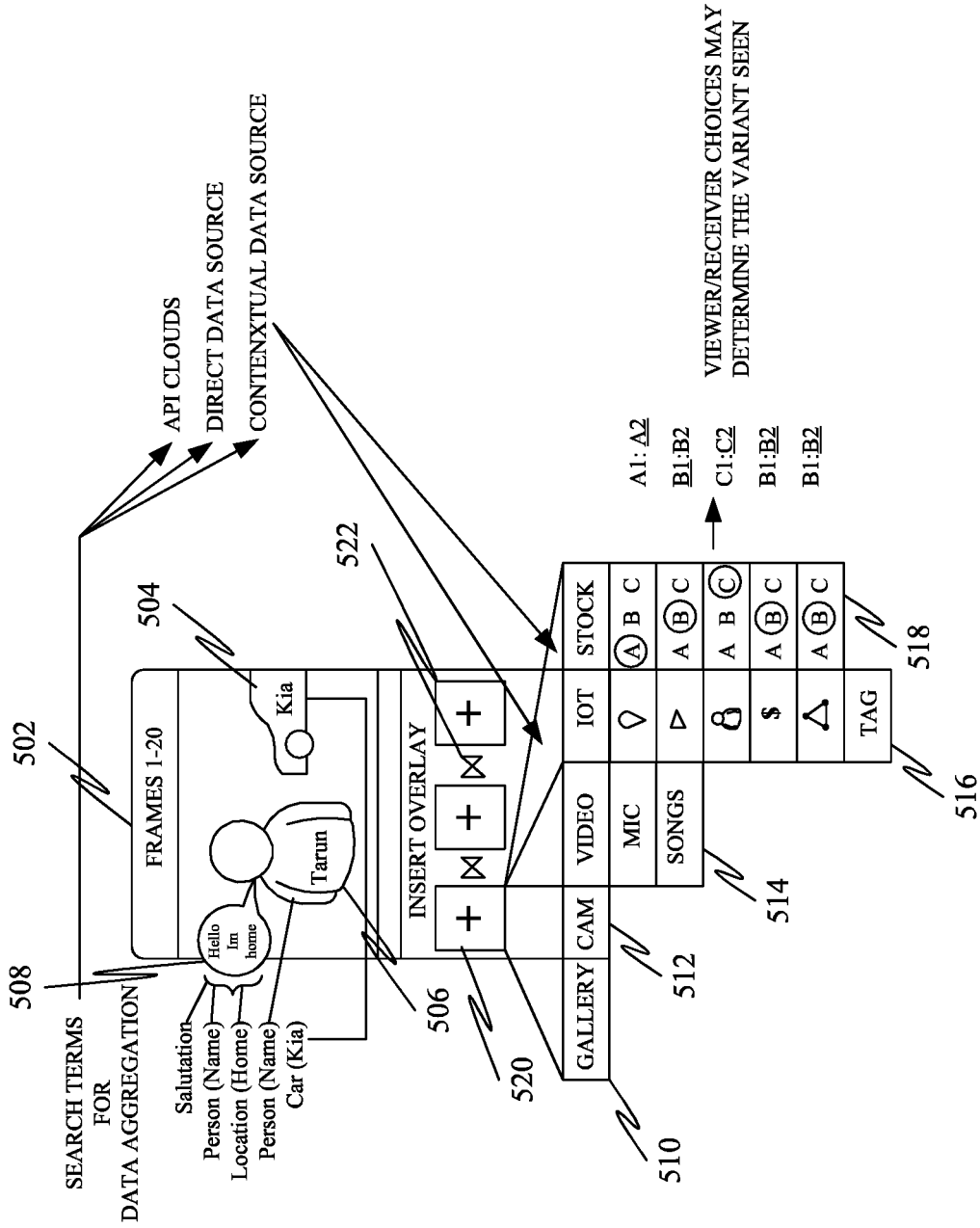
FIG. 5 illustrates an exemplary user interface presentable on a broadcaster device for facilitating augmentation of media content, in accordance with some embodiments.

FIG. 5 illustrates an exemplary user interface 500 presentable on a broadcaster device for facilitating augmentation of media content, in accordance with some embodiments. In an instance, the media content may be analyzed to detect interaction points (e.g. people, places, speech, products, brands, etc.). As illustrated, analysis of frames 1-20 of media content 502 may indicate presence of product 504 (e.g. car KIA), person 506 and message 508 (e.g. greeting). Such analysis may accordingly include, speech recognition, face detection, object detection and so on. Accordingly, based on the detected interaction points, a plurality of augmentation content may be identified and presented to the broadcaster. Further, the analysis of the media content and/or retrieval of augmentation content may be performed by accessing API clouds, direct data sources and contextual data sources. Further, in some embodiments, the detected interaction points may be presented to the broadcaster and a feedback (e.g. confirmation or corrections) may be received. As a result, accuracy of interaction points detection may be improved. Additionally, the interaction points detected may be used for searching the media content and/or the augmented media content based on search terms identified as a result of detecting the interaction points.

In an instance, the user interface may include an "Insert Overlay" GUI element showing two options (insert or overlay) which can be applied to any uploaded clip or contextual content. The GUI elements 520 (boxes with the plus signs) allow the broadcaster to add media content and/or augmentation content, while GUI elements 522 (triangle shaped) in between are for transition options between content.

Further, the plurality of augmentation content may be provided in the form of predetermined categories 516 (e.g. IOT, location, media, person, e-commerce/deals, social/sharing, tags, etc. Further, the augmentation content may include stock images 518 that may be selected and presented to viewers based on contextual data and/or viewer preferences. In an instance, the stock images 518 may be present on a local storage associated with the broadcaster device and/or the viewer device.

Further, the user interface may enable a user, such as the broadcaster, to select the media content from one or more sources (e.g. gallery 510, camera 512, media source 514 that may include video, microphone and songs). Further, the broadcaster can add content via Mic or Camera input (viewfinder, photo/video/audio) or uploaded content source (e.g. Youtube™ or library). Accordingly, all uploaded or real-time (frame based or still image recognition in viewfinder) content can be scanned by image/facial recognition and parsed against databases of content or used as queries to contextual data sources.

Additionally, the user interface may enable a viewer to choose yes/no or toggle contextual suggestions/survey and variants from the broadcaster which conditionally prompt an action.

Figure 6:
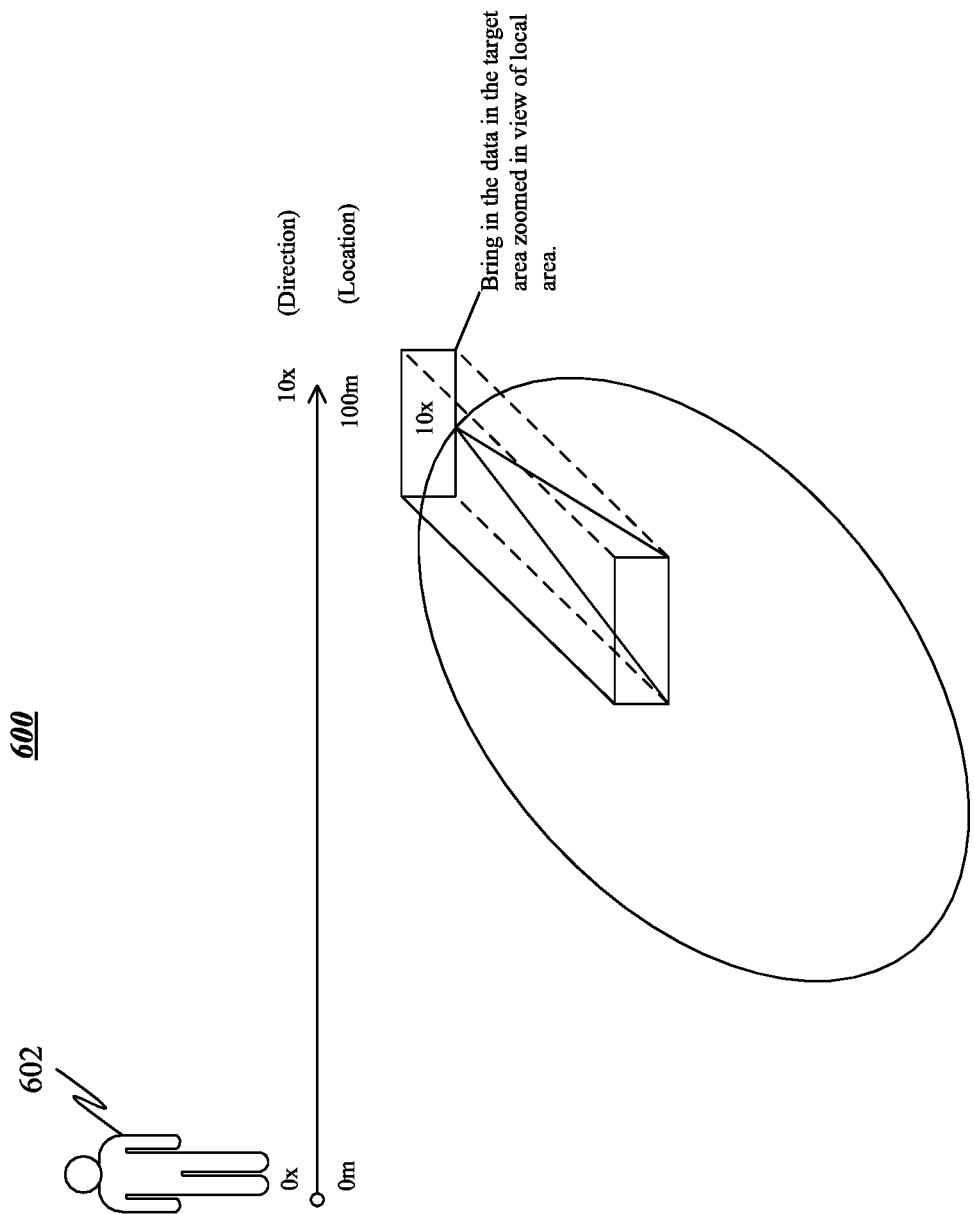
FIG. 6 illustrates augmentation of media content based on viewing region (as characterized by zoom factor, distance etc.) in accordance with some embodiments.

FIG. 6 illustrates augmentation of media content based on viewing region (as characterized by zoom factor, distance etc.) in accordance with some embodiments. Accordingly, a dynamic zoom of the augmented media content may be provided. For instance, if a radius of a user 602 is 10 m or 1× zoom, the user 602 may see contextual data or augmented reality within that area. If the user 602 chooses 100 m or 10× zoom, the viewfinder may display related content around that area for augmented reality and contextual broadcasting. More generally, in some embodiments, the augmentation content presented to a viewer may be based on a portion of the media content being viewed/consumed by the viewer. The portion may correspond to a particular region in space, or an interval in time or both. Accordingly, in some embodiments, the portion of the media content being currently consumed by the viewer may be determined based on view finder status, gaze tracking, and so on. As a result, in some instances, augmentation content that is relevant to a current viewing/listening context may be identified and presented.

Platform Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 700 and 800 have been described to be performed by a computing device 900, it should be understood that, in some embodiments, different operations may be performed by different networked elements in operative communication with computing device 900.

Embodiments of the present disclosure may comprise a system having a memory storage and a processing unit. The processing unit coupled to the memory storage, wherein the processing unit is configured to perform the stages of methods 700 and 800.

Figure 9:
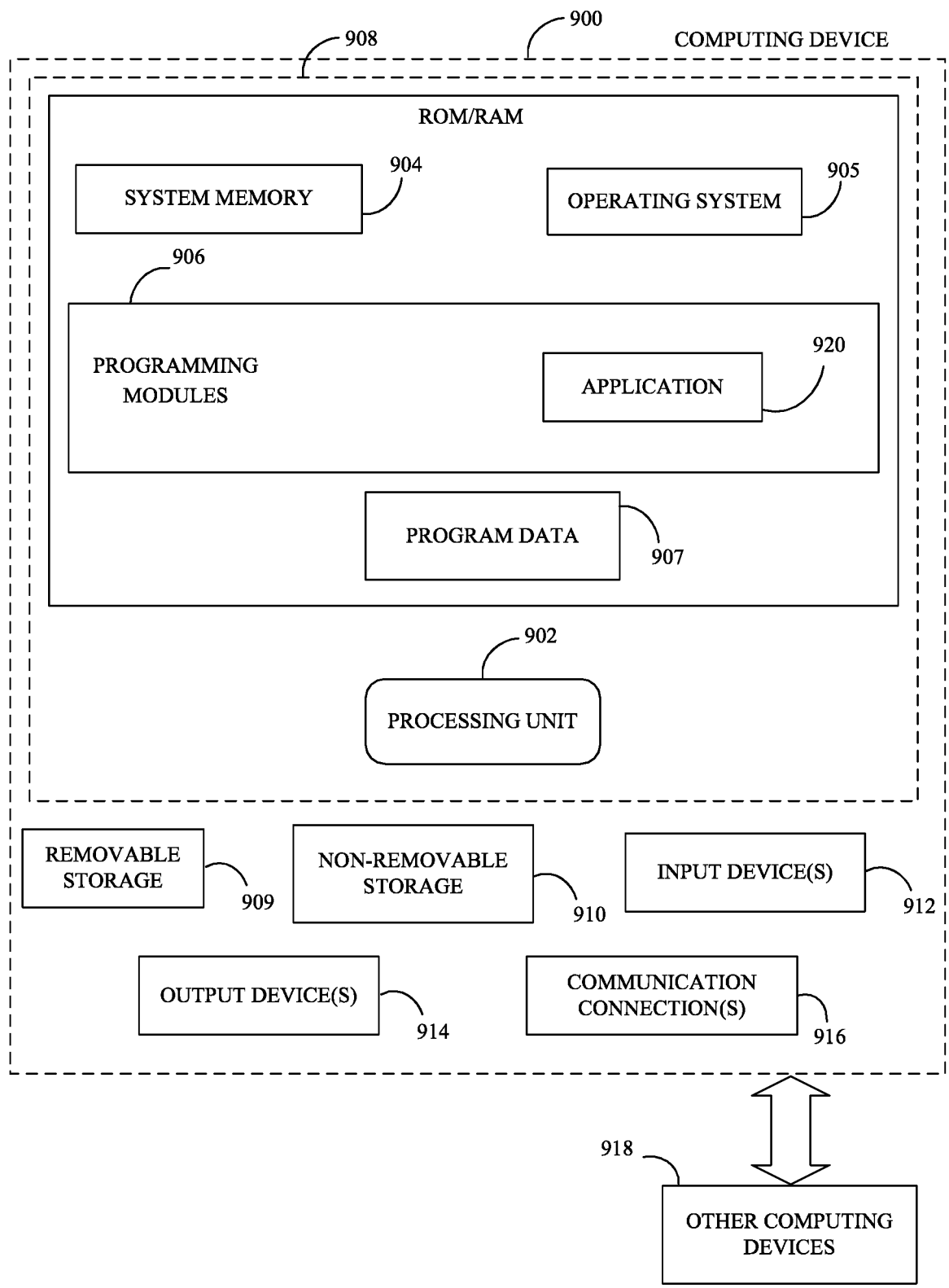
FIG. 9 is a block diagram of a computing device (also referred to herein as a processing unit or processing device) for implementing the methods disclosed herein, in accordance with some embodiments.

FIG. 9 is a block diagram of a system including computing device 900. Consistent with an embodiment of the disclosure, the aforementioned storage device and processing device may be implemented in a computing device, such as computing device 900 of FIG. 9. Any suitable combination of hardware, software, or firmware may be used to implement the memory storage and processing unit. For example, the storage device and the processing device may be implemented with computing device 900 or any of other computing devices 918, in combination with computing device 900. The aforementioned system, device, and processors are examples and other systems, devices, and processors may comprise the aforementioned storage device and processing device, consistent with embodiments of the disclosure.

With reference to FIG. 9, a system consistent with an embodiment of the disclosure may include a computing device or cloud service, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. In one embodiment, programming modules 906 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer-readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 904, including operating system 905. While executing on processing unit 902, programming modules 906 (e.g., application 920 such as a media player) may perform processes including, for example, one or more stages of methods 700 and 800 as described above. The aforementioned process is an example, and processing unit 902 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method of providing augmented media content, the method comprising:
   receiving, using a communication unit, a media content from a broadcaster device;
   analyzing, using a processing unit, the media content;
   identifying, using the processing unit, at least one interaction element in the media content based on the analyzing;
   receiving, using the communication unit, at least one broadcaster preference from the broadcaster device and at least one viewer preference from a viewer device, wherein the broadcaster preference comprises at least one viewer context variable;
   receiving, using the communication unit, viewer interaction data from the viewer device, wherein the viewer interaction data represents interaction of a viewer with the viewer device in association with an augmented content presented on the viewer device;
   retrieving, using the communication unit, a plurality of augmentation content from at least one database based on commonalities between the at least one broadcaster preference and the at least one viewer preference and further based on the at least one interaction element and based on the viewer interaction data, wherein the plurality of augmentation content correspond to multiple users;
   transmitting, using the communication unit, the plurality of augmentation content to the broadcaster device and the viewer device, wherein the broadcaster device and the viewer device present the plurality of augmentation content based on commonalities between the at least one broadcaster preference and the at least one viewer preference;
   receiving, using the communication unit, a selection of at least one augmentation content from the broadcaster device;
   embedding, using the processing unit, each of the at least one augmentation content and the at least one viewer context variable in the media content to obtain an augmented media content, wherein presenting of the augmented media content on the viewer device is based on at least one viewer context value corresponding to the at least one viewer context variable, wherein the at least one viewer context value is associated with the viewer device;
   transmitting, using the communication unit, the augmented media content to the broadcaster device;
   receiving, using the communication unit, at least one broadcaster context value corresponding to at least one broadcaster context variable from the broadcaster device, wherein the retrieving of the plurality of augmentation content is further based on the at least one broadcaster context value, and wherein the at least one broadcaster context variable corresponds to at least one broadcaster sensor comprised in the broadcaster device, and wherein the at least one viewer context variable corresponds to at least one viewer sensor comprised in the viewer device, and wherein the at least one broadcaster preference comprises a conditional statement specifying a condition based on the at least one viewer context variable and an associated augmentation content, and wherein the associated augmentation content is retrieved by the viewer device based on the conditional statement;
   receiving, using the communication unit, at least one time stamp from the broadcaster device, wherein the at least one time stamp is associated with play time of the media content, wherein the embedding of the augmentation content is based on the at least one time stamp, wherein presenting of the augmentation content associated with a time stamp is synchronous with presenting of the media content corresponding to the time stamp;
   receiving, using the communication unit, at least one auto-response content from the broadcaster device, wherein the at least one auto-response content is associated with the augmentation content; and
   embedding, using the processing unit, the at least one auto-response content in the media content, wherein the at least one auto-response content is transmitted via an SMS/email to at least one communication device associated with the viewer device based on an interaction of a viewer with the viewer device in association with the augmentation content.

2. A system for providing augmented media content, the system comprising:
   a communication unit; and
   a processing unit;
   the system being configured for:
      receiving, using the communication unit, a media content from a broadcaster device;
      analyzing, using the processing unit, the media content;
      identifying, using the processing unit, at least one interaction element in the media content based on the analyzing;
      receiving, using the communication unit, at least one broadcaster preference from the broadcaster device and at least one viewer preference from a viewer device, wherein the broadcaster preference comprises at least one viewer context variable;
      receiving, using the communication unit, viewer interaction data from the viewer device, wherein the viewer interaction data represents interaction of a viewer with the viewer device in association with an augmented content presented on the viewer device;
      retrieving, using the communication unit, a plurality of augmentation content from at least one database based on commonalities between the at least one broadcaster preference and the at least one viewer preference and further based on the at least one interaction element and based on the viewer interaction data, wherein the plurality of augmentation content correspond to multiple users;
      transmitting, using the communication unit, the plurality of augmentation content to the broadcaster device and the viewer device, wherein the broadcaster device and the viewer device present the plurality of augmentation content based on commonalities between the at least one broadcaster preference and the at least one viewer preference;
      receiving, using the communication unit, a selection of at least one augmentation content from the broadcaster device;
      embedding, using the processing unit, each of the at least one augmentation content and the at least one viewer context variable in the media content to obtain an augmented media content, wherein presenting of the augmented media content on the viewer device is based on at least one viewer context value corresponding to the at least one viewer context variable, wherein the at least one viewer context value is associated with the viewer device;

transmitting, using the communication unit, the augmented media content to the broadcaster device;

receiving, using the communication unit, at least one broadcaster context value corresponding to at least one broadcaster context variable from the broadcaster device, wherein the retrieving of the plurality of augmentation content is further based on the at least one broadcaster context value, and wherein the at least one broadcaster context variable corresponds to at least one broadcaster sensor comprised in the broadcaster device, and wherein the at least one viewer context variable corresponds to at least one viewer sensor comprised in the viewer device, and wherein the at least one broadcaster preference comprises a conditional statement specifying a condition based on the at least one viewer context variable and an associated augmentation content, and wherein the associated augmentation content is retrieved by the viewer device based on the conditional statement;

receiving, using the communication unit, at least one time stamp from the broadcaster device, wherein the at least one time stamp is associated with play time of the media content, wherein the embedding of the augmentation content is based on the at least one time stamp, wherein presenting of the augmentation content associated with a time stamp is synchronous with presenting of the media content corresponding to the time stamp;

receiving, using the communication unit, at least one auto-response content from the broadcaster device, wherein the at least one auto-response content is associated with the augmentation content; and embedding, using the processing unit, the at least one auto-response content in the media content, wherein the at least one auto-response content is transmitted via an SMS/email to at least one communication device associated with the viewer device based on an interaction of a viewer with the viewer device in association with the augmentation content.

* * * * *